July 25, 1939.  F. EBERHART  2,166,945
CAN-COATING MACHINE
Filed Oct. 24, 1934  3 Sheets-Sheet 1
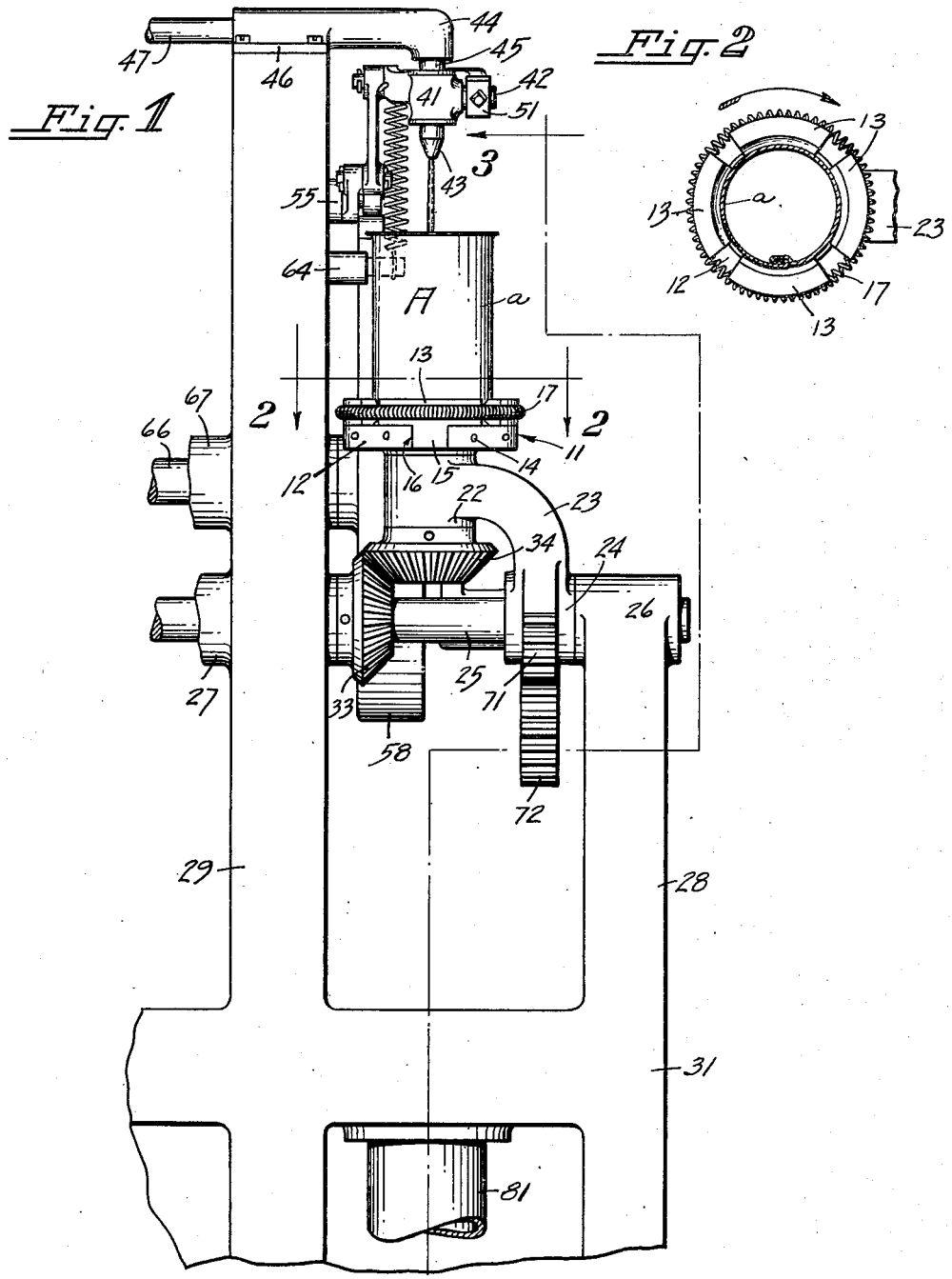
INVENTOR
Felix Eberhart
BY
ATTORNEYS

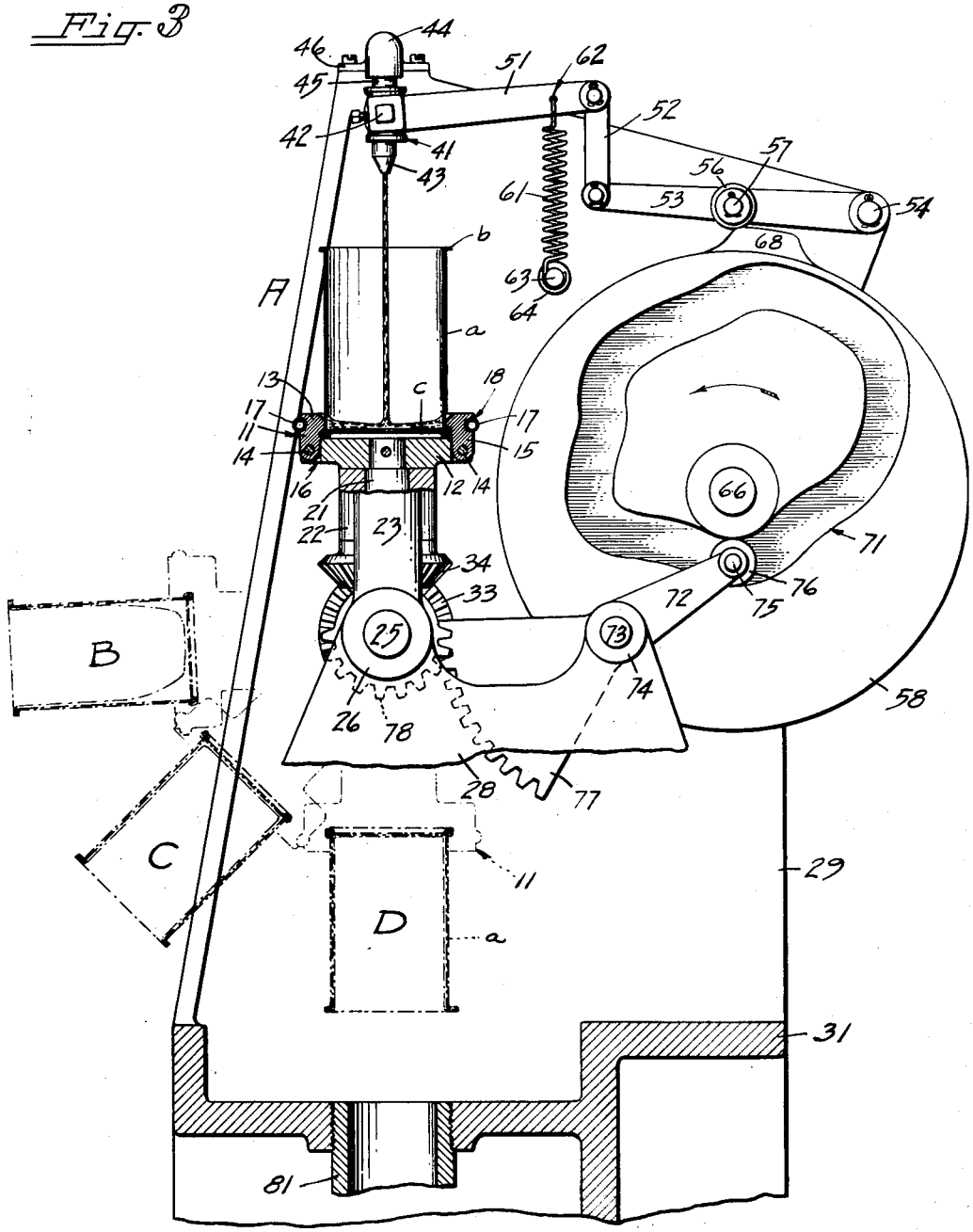

July 25, 1939.  F. EBERHART  2,166,945
CAN-COATING MACHINE
Filed Oct. 24, 1934  3 Sheets-Sheet 3
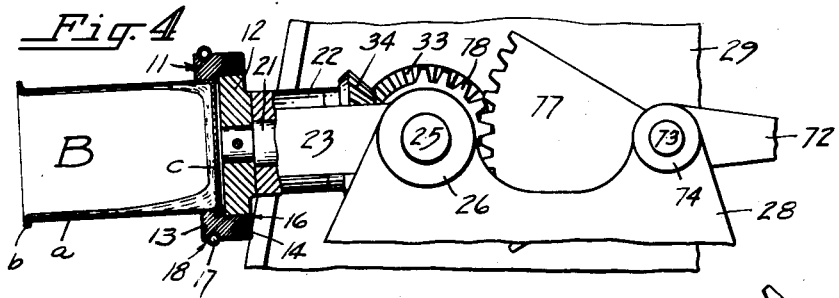
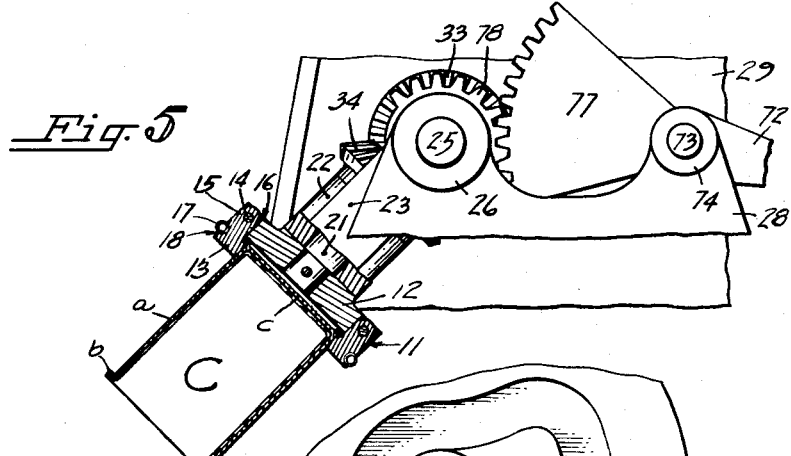
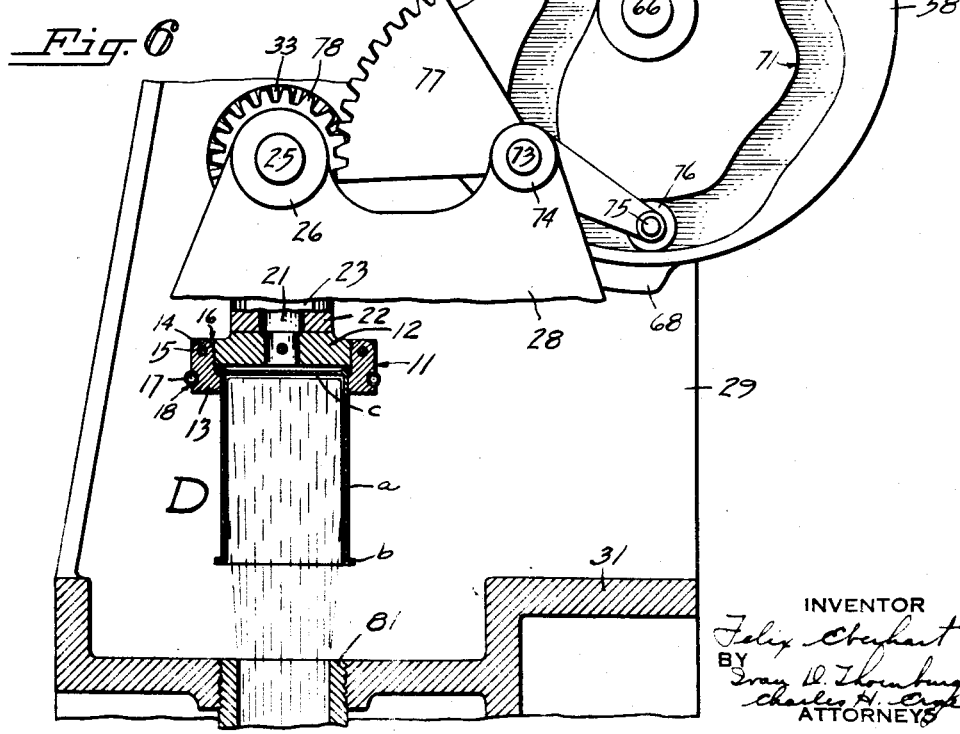

Patented July 25, 1939

2,166,945

UNITED STATES PATENT OFFICE 2,166,945

CAN-COATING MACHINE

Felix Eberhart, Arlington, N. J., assignor to American Can Company, New York, N. Y., a corporation of New Jersey Application October 24, 1934, Serial No. 749,832

15 Claims. (Cl. 91—18)

The present invention relates to can coating machines and has particular reference to such a machine which deposits into the bottom of a rotating can to be coated, a charge of liquid coating material which is just sufficient to cover a desired interior wall surface, and which while still rotating the can tilts it selectively into a plurality of unequally spaced inclinations so as to distribute the charge of material over the surface in a thin uniform coating.

An object of the invention is the provision of a can coating machine which deposits into the bottom of a can to be coated, a predetermined quantity of a liquid coating material which when distributed over the interior can walls will just cover the desired surfaces without any surplus remaining.

Another object is the provision of such a machine which uniformly spreads or distributes a charge of liquid coating material over the desired interior surfaces of a can to be coated by rotating and simultaneously tilting the can intermittently through a plurality of unequally spaced and separate stations arranged to position a can at predetermined inclinations for effecting a predetermined flowing action of the coating material over the can surfaces.

Still another object is the provision of a machine of the character described wherein a can being coated is momentarily held, while rotating, at each of a plurality of definite inclinations, so that the coating material will progressively drain from one part of a surface to another causing it to thin out thus setting up a balance between the gravity flow of the material and its surface adhesion and stopping its flowing action so it will become fixed in the can.

Another object is the provision of such a machine wherein the distributed coating material is permanently set or caused to partially solidify by the application of heat to the coated can surfaces.

Another object is the provision in such a machine of devices for mechanically clamping and supporting a can to be coated whereby the can may be positively held at any desired degree of inclination while it is simultaneously rotated about its longitudinal axis and wherein the can may be clamped or released by merely inserting it into or withdrawing it from the support.

Numerous other objects and advantages of the invention will be apparent as it is better understood from the following description, which taken in connection with the accompanying drawings, discloses a preferred embodiment thereof.

Referring to the drawings:

Figure 1 is a side elevation of a coating machine embodying the instant invention, parts being broken away;

Fig. 2 is a horizontal sectional view taken substantially along the line 2—2 in Fig. 1, illustrating a detail of the machine;

Fig. 3 is a part front elevation and part sectional view taken substantially along the broken line 3—3 in Fig. 1; and Figs. 4, 5 and 6 are fragmentary part elevation part sectional views illustrating different positions of a can being coated and showing also the positions of certain of the working parts of the machine during the coating operation.

In the machine disclosed in the drawings as exemplifying the instant invention, certain operations are automatic and operate in timed sequences and cans a to be coated are placed by hand or otherwise in a rotating chuck which is provided with clamping jaws for holding the can in position. The cans are preferably cylindrical in shape and have one end open, which end may be outwardly flanged as at b. The closed bottom end of the can is designated by the letter c.

The chuck is mounted in an oscillatable bracket arm which in its movement is adapted to bodily carry the chuck and the positioned can into and through a plurality of unequally spaced and separated stations arranged to effect a predetermined definite flowing or distributing action of the coating material. The can pauses at each station, while can and chuck continuously rotate about the longitudinal axis of the can.

The first of these stations, indicated by the letter A in Fig. 3 is a coating material depositing station which is also the station where the can to be coated is positioned in the rotating chuck. The can is upright with its open end directly under an automatically operated valve unit. At a given time in the cycle of the machine the valve is opened and a predetermined quantity of a liquid coating material is deposited into the can. This measured charge of coating material is just sufficient to cover the desired interior surfaces of the can when distributed without any surplus remaining.

This charge of material strikes against the center of the bottom of the rotating can and is immediately spread or distributed over the entire bottom surface by centrifugal action due to the can's rotation. This action also forces the material into the joint formed at the juncture of the can bottom and its side wall and also causes the material to rise slightly and cover a part of the can side wall adjacent the bottom.

Following this part of the operation the arm carrying the rotating can is rocked to position the can substantially horizontally at a station B. In this position (Figs. 3 and 4) some of the coating material is drawn by gravity away from the can bottom and is distributed over the can side wall surface. The rotation of the can causes the material to flow in a helical path of travel toward the open end of the can, thoroughly covering the entire side wall surface and extending down onto the can flange. This action leaves the material remaining on the can bottom surface well smoothed out and evenly distributed. It should be understood, however, that at this time the coating on the side wall surface is not uniform in thickness but is thicker near the bottom end of the can than it is at the open end.

To prevent too much of the coating material from being drawn away from the can bottom the can is now moved to a station C where its axis preferably at an angle of approximately 45°. In this position the thicker portion of the coating is further thinned out by a combined centrifugal and longitudinal flowing action which further distributes the material over the desired surface in a smooth coat of uniform thickness. At the same time due in part to the volatile nature of the material there is set up in the coating material itself a balance of forces between the gravity flow of the material and its surface adhesion which counteract each other and have the effect of stopping the flow of the material thus temporarily holding it in place.

While in this condition the can is moved to a station D where it is brought into an inverted vertical position, directly over a continuously operating hot air blast. The heated air is blown into the can and plays against its coated surfaces, solidifying or setting the coating.

The can is now rocked in the opposite direction and is returned in a single sweep back to the station A. It is then removed from the chuck by hand or otherwise and another can placed in the machine for its next cycle of operation.

A preferred form of apparatus embodying the invention and which is the machine disclosed in the drawings, comprises in part a can holding chuck 11 (Figs. 1 and 3) which supports the can a to be coated. The can rests on a flat disc 12 (Fig. 3) and is centralized and clamped in position by pivoted jaws 13 which engage the can exterior side wall just above its bottom end c.

There are four jaws 13 arranged in a circle around the can as shown in Fig. 2. Each jaw is mounted on a pivot pin 14 (see also Figs. 1 and 3) which is secured in a lug 15 which depends from the jaw and which engages within a slot 16 cut in the periphery of the chuck disc. The ends of the pin are carried in suitable bearings formed in the disc adjacent the slot 16.

The jaws are tied together by an endless coiled spring 17 which seats within grooves 18, cut in the outer side walls of the jaws near their upper edges. In this manner the spring yieldingly holds the inner faces of the jaws against the can and clamps the latter in proper position.

The chuck 11 is continuously rotated about its central axis which is also the central longitudinal axis of a positioned can. The chuck disc 12 is pinned to one end of a shouldered shaft 21 which is journaled in a bearing 22 formed at one end of a bracket arm 23. The other end of the arm is formed with a hub 24 which is loosely mounted on a horizontal shaft 25.

The shaft 25 is carried in bearings 26, 27 formed in vertical leg members 28, 29 which constitute a part of a main frame 31. The shaft is continuously rotated in any suitable manner in time with the other parts of the machine and in turn drives the chuck shaft 21 through a pair of meshing bevel gears 33, 34. The gear 33 is pinned on the shaft 25 adjacent and inside of the bearing 27 and gear 34 is pinned to the free end of the shaft 21 adjacent to and inside of the bearing 22. Through this gear connection the chuck 11 and a positioned can a are continuously rotated.

The can when first placed in the rotating chuck 11 at the station A is in position to receive the measured charge of coating material, its open end being directly under a valve or pet cock 41 controlled by a valve stem 42. The bottom outlet of the valve is formed as a dispensing nozzle 43 which is in vertical alignment with the longitudinal axis of the can. The upper outlet of valve 41 is connectd to one end of an elongated pipe elbow 44 by a short connecting pipe 45.

The elbow is part of a bracket 46 which is bolted on top of the frame leg 29. The other end of the elbow connects with a pipe 47 which leads to a supply of liquid coating material. This coating material is conveyed to the valve 41 under pressure in any suitable manner.

At a given time in the cycle of the machine the valve 41 is opened by cam action and deposits the predetermined measured charge of coating material into the can. This is accomplished by actuation of the valve stem 42 which is connected to one end of a substantially horizontal arm 51 (Fig. 3). This arm is connected to the upper end of a vertical link 52. The lower end of this link connects with a lever 53 which is pivoted on a stud 54, the stud being secured in a boss 55 (Fig. 1) formed on the leg 29.

Intermediate its length, the lever 53 carries a cam roller 56 which is mounted on a pin 57 secured in the lever and which frictionally engages the outer periphery of a combined edge and face cam 58. The roller is held into engagement with the cam edge by a spring 61 which is interposed between the lever 51 and a pin 63 secured in a boss 64 formed on the leg 29.

The cam 58 is mounted on one end of a shaft 66 which is journaled in bearings 67 formed in the leg 29, the shaft being continuously rotated in any suitable manner and in time with the other moving parts of the machine. As the cam rotates a protuberance 68 is brought under and lifts the cam roller pivoting the lever 53 and opening the valve. The length of time the cam protuberance is in engagement with the cam roller determines how long the valve remains open and thus effects a deposit of the desired quantity of the material.

After the distribution of the deposited material over the can bottom as explained hereinbefore the rotating can and chuck 11 are bodily moved to the station B (Fig. 4) where the coating material is next flowed over the inner surface of the side walls of the can.

This shift of can and chuck is effected by a rocking movement of the arm 23 about the axis of the drive shaft 25, the arm being actuated by a suitable cam groove 71 cut in the face of the cam 58. The shape of the cam groove is such as to rock the arm by unequal steps through a plurality of successive predetermined positions and between each position to momentarily hold the arm stationary.

To transmit this cam action a lever 72 is interposed between the arm and the cam. The lever is pivoted intermediate its ends on a stud 73 which is carried in a boss 74 formed in the frame leg 28. One end of the lever carries a stud 75 on which is mounted a cam roller 76 which engages within the cam groove 71. The opposite end of the lever is enlarged into a segment gear section 77 the teeth of which mesh with another segment gear section 78 formed on the hub 24 of the arm.

At station C as shown in Fig. 5, the coating is further spread and is finally uniformly distributed over the can walls. This completes the flowing action of the coating material which is now held in place by a balance of forces as previously described.

At the station D (Fig. 6) the can coating is finally set by the application of heat. The open end of the rotating can is now directly over and in vertical alignment with one end of a pipe 81 by means of which hot air is projected into the open end of the can.

In this manner a can after receiving a predetermined measured charge of coating material is continuously rotated and tilted intermittently through a plurality of predetermined inclinations following one after the other in the same direction so as to cause the coating material to be distributed under control and over the desired surfaces of the can interior in a smooth even coat without any surplus material remaining, the fully coated can being returned by movement in the opposite direction.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A can coating machine comprising in combination, means for depositing a liquid coating material into the upper open end and the bottom of a can to be coated, means for rotating and tilting said can into a plurality of unequally spaced predetermined inclinations so as to distribute said coating material, under control, over a desired interior surface of the can, and a movable cam for regulating the tilting of the can and having means for moving the can upward and downward in an arcuate path, said cam having a surface which delays the tilting of the can and holds the same with one side downward for the distribution of coating material around the inner surface of the can.

2. A can coating machine comprising in combination, means for depositing a predetermined quantity of liquid coating material into the bottom of a can to be coated, means for rotating said can, and a movable cam for tilting said can upward and downward through a plurality of unequally spaced predetermined inclinations while rotating, for controlling the flow of said coating material and for distributing it over the interior surface of the can, said cam having a dwell portion whereby the can is held out of vertical position while it is being rotated, for the complete distribution of coating material therein.

3. A can coating machine comprising in combination, means for dispensing a liquid coating material into a can to be coated, means for distributing said coating material over a desired interior surface of said can, a movable cam for regulating the distributing movement of the can, said cam having means for regulating the dispensing of the coating liquid, and means associated with said dispensing means and said distributing means for heating said distributed coating material to cause it to set, said cam having a dwell portion whereby the can is held out of vertical position while it is being rotated, for the complete distribution of coating material therein.

4. A can coating machine comprising in combination, means for depositing a predetermined quantity of liquid coating material into a can to be coated, means for rotating said can, means for tilting said can through a plurality of inclinations while rotating so as to distribute said coating material over the interior suface of the can, means for causing the can to dwell in its tilting movement while one side of the can is downward, and means for heating said distributed coating material while still rotating said can to cause the same to set.

5. A can coating machine comprising in combination, valve means for depositing a liquid coating material into a can to be coated, means for actuating said valve for measuring out a predetermined quantity of said material which will just cover the interior surfaces of the can without any surplus remaining, means for rotating and tilting said can downward and then upward to distribute said measured material over its interior surfaces, and means for heating said distributed coating material to cause the same to set.

6. A can coating machine comprising in combination, means for depositing a liquid coating material into the bottom of a can to be coated, a chuck for holding the can, means for rotating said chuck and can, means for intermittently tilting the chuck and can through a plurality of unequally spaced predetermined inclinations while rotating so as to distribute said coating material over the interior surface of the can, and a movable cam for regulating the tilting of the chuck.

7. A can coating machine comprising in combination, means for depositing a liquid coating material into a can to be coated, a chuck for holding the can, means for rotating said chuck and can, means for intermittently tilting the chuck and can through a plurality of inclinations while rotating so as to distribute said coating material over the interior surface of the can, and means for projecting a stream of heated air against said coated surface for permanently setting said coating material.

8. A can coating machine comprising in combination, means for depositing a liquid coating material into a can to be coated, a chuck for holding the can, means for rotating said chuck and can, means for tilting the chuck and can, while rotating, in one direction at a given rate of travel through a plurality of inclinations so as to distribute said coating material over the interior surface of the can and for returning the chuck and can in another direction at a different rate of travel, and a movable cam for regulating the tilting of the chuck.

9. In a can coating machine the combination of means for charging a can with a defined amount of liquid coating material, means for moving and rotating and inclining the can, and means for delaying the inclining movement, to distribute the coating on the entire inner surface of the can, and means for setting the distributed coating into registry with which setting means the interior of the can is brought by said distributing movement.

10. In a can coating machine, a chuck adapted to hold a can to be coated comprising, a disc for supporting a can on end, pivoted jaws associated with said disc and surrounding said can, spring means associated with said jaws for resiliently holding them in engagement with said can, so that the can may be readily inserted into or withdrawn from said jaws, means for rotating and inclining the can to distribute the coating therein, and means for setting the distributed coating while the can is held by said spring means.

11. In a can coating machine the combination of a rotary can holder, means for rotating said holder, means for swinging said holder in an arcuate path to hold the open part of the can upward to receive a charge of coating material and thence downward to aid in the distribution of said material on the can surface, and means for delaying the movement of said holder while it is in a position to hold the can with one side downward, said swinging means being reversible to return said can to normal position.

12. In a can coating machine the combination of a rotary can holder, means for rotating said holder, means for swinging said holder in an arcuate path to hold the open part of the can upward to receive a charge of coating material and thence downward to aid in the distribution of said material on the can surface, means for charging the can with said material, and means for delaying the bodily movement of said holder while the can is held with one side downward, said swinging means being reversible to return said can to normal position.

13. In a can coating machine the combination of a rotary can holder, means for rotating said holder continuously and means for swinging said holder in an arcuate path downwad and upward to hold the open part of the can upward to receive a charge of coating material and thence downward means for delaying the bodily movement of said holder while the can is rotated with one side downward to aid in the distribution of said material on the can surface.

14. In a can coating machine the combination of a rotary can holder, means for rotating said holder continuously, means for swinging said holder in an arcuate path to hold the open part of the can upward to receive a charge of coating material and thence downward, and a rotary cam for delaying the bodily movement of said holder while the can is held and rotated with one side downward to aid in the distribution of said material on the can surface, said swinging means being reversible to return said can to normal position.

15. A can coating machine having in combination, a holder for a can to be coated interiorly, means for swinging said holder downward and upward, means for rotating said holder, means for depositing a liquid coating material into the bottom of a can, and a cam for delaying the swinging movement of the can while it contains liquid coating material and while the rotary movement of the holder and can is maintained, said cam having means for actuating said depositing means.

FELIX EBERHART.